United States Patent [19]

Tanimoto

[11] 4,339,824
[45] Jul. 13, 1982

[54] CLOCK RECOVERY CIRCUIT FOR TDMA SYSTEM OR MESSAGE SWITCHING SYSTEM

[75] Inventor: Yoshio Tanimoto, Tokyo, Japan

[73] Assignee: Nippon Electric Co., Ltd., Tokyo, Japan

[21] Appl. No.: 161,534

[22] Filed: Jun. 20, 1980

[30] Foreign Application Priority Data

Jun. 20, 1979 [JP] Japan ................................. 54/77814

[51] Int. Cl.³ .......................... H04L 7/00; H03K 9/04
[52] U.S. Cl. .................................... 375/110; 375/113;
370/104; 328/110; 328/119; 328/164
[58] Field of Search ............... 328/109, 110, 119, 164,
328/74, 61, 60; 307/522; 370/104; 375/110, 113

[56] References Cited
U.S. PATENT DOCUMENTS 2,942,196   6/1960  De Lange ......................... 328/164
3,902,014   8/1975  Lindell et al. ..................... 375/110
3,924,068  12/1975  Fletcher ............................ 375/113
4,088,832   5/1978  Eastmond ......................... 375/110

Primary Examiner—John S. Heyman
Attorney, Agent, or Firm—Sughrue, Mion, Zinn, Macpeak & Seas

[57] ABSTRACT

A burst communications clock recovery network is provided with a pair of clock signal extracting band-pass filters in order to provide both rapid clock recovery and a low noise clock signal. The first band-pass filter is provided with a relatively wide bandwidth and provides rapid clock recovery. The second band-pass filter has a relatively narrow bandwidth and provides a highly stable, low noise clock signal. The output of the clock recovery network is switched from the wide band-pass filter to the narrow band-pass filter when the average voltage from the wide bandpass filter decays to a predetermined value.

2 Claims, 9 Drawing Figures

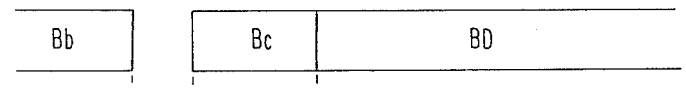
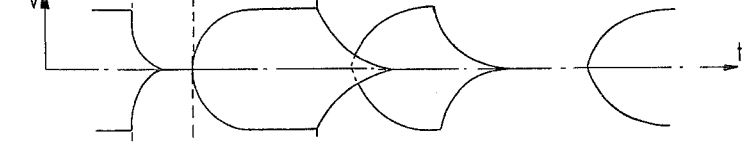
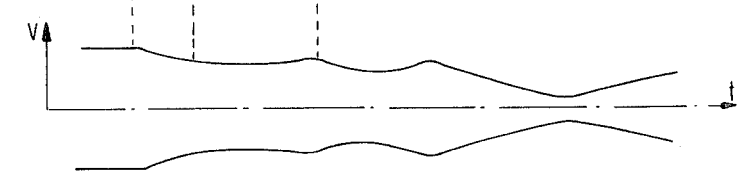
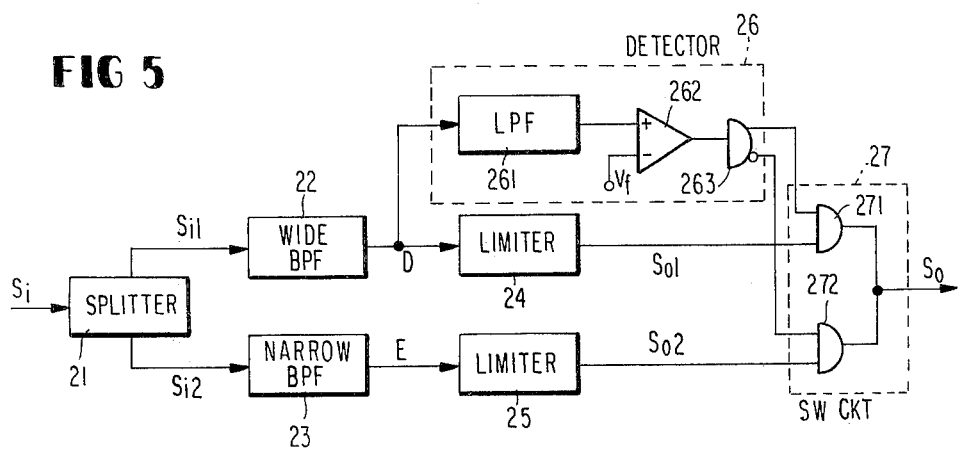
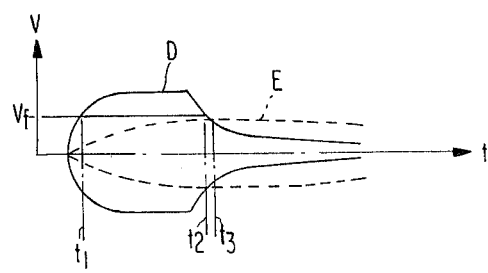

CLOCK RECOVERY CIRCUIT FOR TDMA SYSTEM OR MESSAGE SWITCHING SYSTEM

BACKGROUND OF THE INVENTION

The present invention relates to clock recovery circuits in digital data communication systems, and more particularly to clock recovery circuits for recovering clock signals from burst mode signals in the time division multiple-access (TDMA) satellite communication systems or in the message switching system for cable data communication.

In the TDMA system for satellite communications, a plurality of earth stations transmit intermittent signals (bursts) on a common carrier frequency in mutually different, allocated time slots and share a single satellite-carried repeater on a time-division basis. In the message switching system for cable data communications, on the other hand, messages from a plurality of incoming trunk lines are first stored in buffer memories or the like, and subsequently transmitted on outgoing trunk lines to be connected in a burst mode on a time-division basis. These systems for time-division use of radio or cable lines afford high transmission efficiencies, and moreover contribute to flexible system operation.

However, when clock signals between message bursts, i.e. between earth stations or between messages, are unsynchronized, it is required on the receiving side, for each burst received, to recover a clock signal synchronized with the clock on the transmitting side in order to properly decode the received signals. A clock recovery circuit for this purpose generally has a band-pass filter whose center frequency is the clock frequency from the transmitting side, provided to improve a signal-to-noise (S/N) ratio of the recovered clock. Although stable clock signals can be obtained by sufficiently restricting the bandwidth of the band-pass filter, this would result in a longer rise time of the amplitude response of the band-pass filter in the burst mode and therefore in a deteriorated transmission efficiency. Conversely, widening the band to raise the transmission efficiency would adversely affect the stability of the recovered clock. These competing factors become even more critical with an increase in clock pulse rate.

SUMMARY OF THE INVENTION

The objective of the present invention therefore is to provide a clock recovery circuit which is directed to a solution of the foregoing problems associated with prior clock recovery circuit.

In accordance with the present invention, there is provided a clock recovery circuit comprising splitting means for dividing an input signal containing a clock component into two split outputs provided at first and second output terminals; first band-pass filter means connected to the first output terminal and having a first bandwidth selected as to permit extraction of the clock component; second band-pass filter means connected to the second output terminal and having a second bandwidth narrower than said first bandwidth and also selected as to permit extraction of the clock component; first and second amplitude limiter means for limiting the output amplitudes of the first and second bandpass filter means, respectively; switching means responsive to a control signal for selectively supplying either of the outputs of the first and second amplitude limiter means; and control signal generating means responsive to the output of the first band-pass filter means for generating the control signal, wherein the clock component extracted from the input signal is supplied as an output of the switching means.

BRIEF DESCRIPTION OF THE DRAWINGS

Other features and advantages of the present invention will be more apparent from the detailed description hereunder taken in conjunction with the accompanying drawings, wherein:

FIG. 4A illustrates an example of a burst composition;

FIGS. 4B and 4C illustrate amplitude responses of wide-band and narrow-band band-pass filters, respectively;

FIG. 5 is a block diagram illustrating an embodiment of the clock recovery circuit composition in accordance with the present invention; and FIG. 6 is a waveform diagram to facilitate explanation of the operation of the circuit illustrated in FIG. 5.

DETAILED DESCRIPTION OF THE INVENTION

Figure 1:
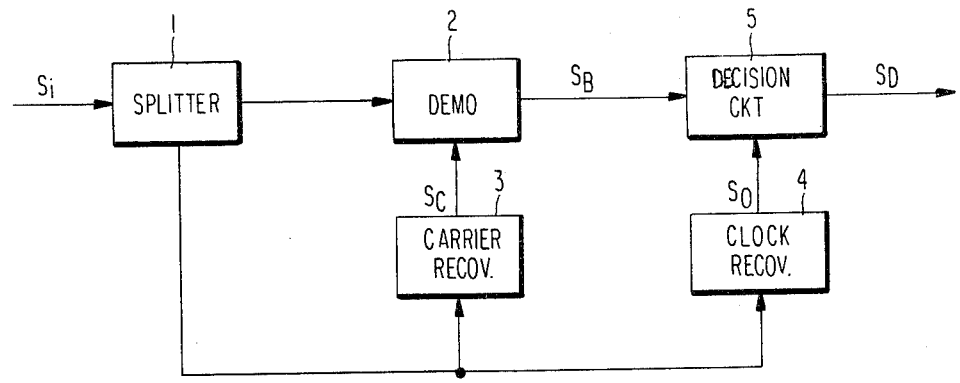
FIG. 1 is a block diagram illustrating the principal part of the demodulator section on the receiving side in a TDMA system or message switching system.

In FIG. 1, a received modulated wave $S_i$ is split by a splitter circuit 1, and supplied to a demodulating circuit 2, carrier recovery circuit 3 and clock recovery circuit 4. The demodulator circuit 2 synchronously detects the received modulated signal $S_i$ with a recovered carrier $S_c$ from the carrier recovery circuit 3, and then supplies a base-band signal $S_B$ as its output. A data recovery circuit 5 recognizes the base-band signal $S_B$ in conformity with the timing of a recovered clock $S_0$ from the clock recovery circuit 4, and thereby produces data $S_D$. A demodulator like the one illustrated in FIG. 1 is described, with reference to a quadraphase PSK modulated wave, in S. Yokoyama et al., "The Design of a PSK MODEM for the Telesat TDMA System", ICC 75, June 16-18, San Francisco.

Figure 2:
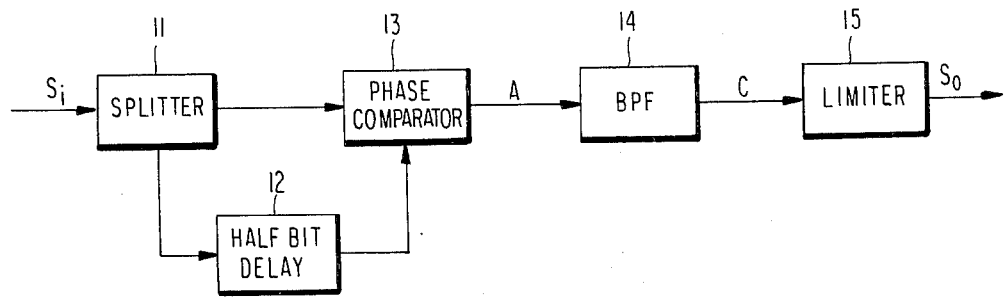
FIG. 2 is a block diagram illustrating a conventional clock recovery circuit contained in the demodulator section illustrated in FIG. 1.

FIG. 2 is a block diagram illustrating the clock recovery circuit 4 conventionally used in the demodulator section of FIG. 1. The input signal $S_i$ to be supplied to a splitter circuit 11 is assumed to be a quadraphase modulated wave. The input signal $S_i$ is equally divided by the splitter circuit 11, into two signals, one being directly supplied to a phase comparator 13 and the other supplied to the phase comparator 13 after being delayed by one-half of a bit time slot by a delay circuit 12. An output signal A from the phase comparator 13 contains a substantially continuous frequency spectrum with a relatively high spectral energy component representing the clock frequency.

A band-pass filter 14 limits the bandwidth of this output A from the phase comparator 13 to reduce its noise component and extract its clock component. The extracted clock component C is supplied as a recovered clock $S_0$ after being amplitude limited at an amplitude limiter 15.

Figure 3A:
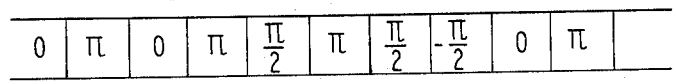
FIGS. 3A and 3B are waveform diagrams to facilitate explanation of FIG. 2.
Figure 3B:

FIG. 3A shows an example of phase relationship between the time slots of the input quadraphase modulated signal $S_i$. The input signal $S_i$ generally experiences severe bandwidth restriction suffered during the transmission through the transmission path and, although its phase shift is instantaneously completed where a 180° phase shift takes place between adjoining time slots, the signal phase varies slowly to produce a ±90° phase shift. As a result, the output response of the phase comparator 13 to the input modulated signal $S_i$ having the phase relationship illustrated in FIG. 3A is such as shown in FIG. 3B. Thus, extraction of the clock component is achieved only in 180° phase shifts but rarely in 0° or ±90° phase shifts. In other words, the S/N ratio of the clock component extracted from the phase comparator 13 heavily depends on transmitted data and, assuming random data, the probability of clock component extraction is approximately ¼ in the case of a quadra-phase modulated wave.

Generally in the burst structure for a TDMA system or the like, a clock synchronization pattern $B_C$ is set in the leading section of a burst, followed by a data section $B_D$, as illustrated in FIG. 4A, where $B_b$ is the preceding burst. The optimum pattern for clock recovery is selected as clock synchronization pattern $B_C$, and usually a 180° phase shift pattern is used in quadraphase modulation.

The amplitude responses of the output C of the bandpass filter 14 (FIG. 2) to this burst input signal are illustrated in FIGS. 4B and 4C, in which FIG. 4B shows the amplitude response when the band of the filter 14 is wide, and FIG. 4C when the band is narrow.

To achieve a high transmission efficiency, it is desirable to shorten the length of the synchronization pattern $B_C$ and to suppress the phase jitter of the recovered clock to be used for regeneration of data $B_D$. To quickly establish clock synchronization in each burst, the synchronization time, i.e., the clock acquisition time should be shortened by expanding the bandwidth of the band-pass filter 14 as illustrated in FIG. 4B. However, a greater bandwidth would result in increase of noise component, phase jitter of the recovered clock, and thereby deterioration of the S/N ratio in the data section $B_D$. On the other hand, if the bandwidth is narrowed to improve the S/N ratio, the clock acquisition time will increase, and the clock phase component of the preceding burst $B_b$ will remain in the leading section of the current burst to interfere with the clock synchronization as shown in FIG. 4C.

Thus, the choice of the bandwidth for the band-pass filter directly affects the clock synchronization performance, and clock recovery circuits of prior art have the disadvantage of being unable to simultaneously satisfy the competing requirements to quickly establish the clock synchronization and suppress noise and phase jitter. This disadvantage, as mentioned above, causes a serious impediment to communication in a high-speed clock burst mode.

FIG. 5 illustrates an example of clock recovery circuit in accordance with the present invention. An input signal $S_i$ containing a clock component is divided equally by a splitter circuit 21, one signal segment $S_{i1}$ being applied to a wide bandpass filter 22 to undergo extraction of its clock component. The extracted clock component D is applied to an amplitude limiter 24 to provide a recovered clock $S_{01}$, which is then delivered to a switch circuit 27. Meanwhile, the other signal segment $S_{i2}$ is applied to a narrow bandpass filter 23 to simultaneously undergo extraction of its clock component. The extracted clock component E is supplied to an amplitude limiter 25 to provide a recovered clock $S_{02}$ and then delivered to the switch circuit 27. A detector 26 detects the output amplitude of the wide bandpass filter 22 and supplies a control signal to the switch circuit 27. Based on this control signal, the switch circuit 27 switches either the recovered clock $S_{01}$ or $S_{02}$ and gives a recovered clock output signal $S_0$.

FIG. 6 illustrates the output amplitude responses (envelope signals) of the two band-pass filters 22 and 23, wherein the solid line D, and broken line E, respectively, represent the output amplitude responses of the band-pass filters 22 and 23.

The wide band-pass filter 22 is intended for fast clock recovery to complete clock synchronization of the burst in the clock synchronization section $B_C$ (see FIG. 4A). Therefore, the bandwidth of the wide band-pass filter 22 is set wide enough to give an output response speed to meet this purpose. On the other hand, the narrow band-pass filter 23 is intended for clock recovery with less phase jitter in the data section $B_D$. In setting its bandwidth, therefore, the priority of the narrow band-pass filter is given to S/N ratio improvement rather than to accelerating the output response speed.

The bandwidth of the narrow band-pass filter 23 is chosen to produce, for instance, about half the output amplitude of the wide band-pass filter 22 at the trailing edge of the clock synchronization section $B_C$. When it is so set, the output amplitude of the wide band-pass filter 22 quickly falls in the data section $B_D$ and, from a certain point of time on ($t_3$ in FIG. 5), the S/N ratio of the output clock component of the narrow bandpass filter 23 exceeds that of the wide band-pass filter 22, ultimately by the bandwidth ratio. As a result, the recovered clock $S_{02}$ produces less phase jitter than the recovered clock $S_{01}$.

The detector 26 detects the output amplitude of the wide band-pass filter 22 and supplies the switch circuit 27 with a control signal so that it may deliver as its output the clock signal $S_{01}$ recovered by the wide bandpass filter 22 in the clock synchronization section $B_C$, and after time $t_3$, the clock signal $S_{02}$, where the output S/N ratio relationship between the two band-pass filters 22 and 23 is reversed. This control signal is obtained in the following manner. A low-pass filter 261 filters the output signal of the wide band-pass filter 22, this filtered signal having a general form similar to the solid line D in FIG. 6 in the clock synchronization section $B_C$. The output of filter 261 is voltage-compared in a differential amplifier 262 with a reference voltage $V_f$ which is slightly higher than the amplitude at which the output S/N relationship between the two band-pass filters 22 and 23 is reversed. In response to a positive output of differential amplifier 262, gate 263 provides logic "1" and an inverted logic "0".

The switch circuit 27 contains AND gates 271 and 272 which respond to the logic "1" or "0" output of the detector 26. When differential amplifier 262 provides a logic "1" output, the gate 271 opens and the gate 272 is closed. Conversely, when differential amplifier 262 provides a logic "0" output, the gate 272 opens and the gate 271 is closed. Therefore, before the entry of a burst or before time $t_1$, and after the establishment of synchronization or after time $t_2$, the stable recovered clock $S_{02}$ from the narrow band-pass filter 23 is delivered through the switch circuit 27 as the recovered clock $S_0$. On the other hand, during the duration of clock synchronization, or between times $t_1$ and $t_2$, the recovered clock $S_{01}$ from the wide band-pass filter 22, which is shorter in the clock acquisition time, is supplied by the switch circuit 27.

Thus in accordance with the present invention, since the clock recovery is achieved by a wide band-pass filter in the clock synchronization section and by a narrow band-pass filter in the data section, it is possible to rapidly establish clock synchronization and further to obtain recovered clock signals having low noise components such as phase jitter, during data reception.

What is claimed is:

1. A clock recovery circuit comprising:
    splitting means for dividing an input signal containing a clock component into two split outputs provided at first and second output terminals;
    first band-pass filter means connected to said first output terminal and having a first bandwidth selected as to permit extraction of said clock component from said input signal;
    second band-pass filter means connected to said second output terminal and having a second bandwidth narrower than said first bandwidth and also selected as to permit extraction of said clock component from said input signal;
    first and second amplitude limiter means limiting the output amplitudes of said first and second band-pass filter means, respectively;
    switching means responsive to a control signal for selectively supplying one of the outputs of said first and second amplitude limiter means; and
    control signal generating means responsive to the output of said first band-pass filter means for generating said control signal, wherein said clock component extracted from said input signal is supplied as an output of said switching means.

2. A clock recovery circuit, as claimed in claim 1, wherein said control signal generating means comprises: means for low-pass filtering the output of said first bandpass filter means, means for voltage-comparing the output of said low-pass filter means with a predetermined reference voltage, and first gate means for generating logic "1" and "0" outputs in response to the output of said voltage comparing means; and wherein said switching means comprises: second and third gate means respectively connected to the outputs of said first and second amplitude limiter means and to the outputs of said first gate means, and means for combining the outputs of said second and third gate means.

* * * * *